(No Model.)

A. BURBANK.
Culinary Steamer.

No. 231,266. Patented Aug. 17, 1880.

Attest.
R. F. Osgood.
Chas. F. Spinner
Jacob Spahr

Inventor.
Abner Burbank

UNITED STATES PATENT OFFICE.

ABNER BURBANK, OF ROCHESTER, NEW YORK, ASSIGNOR OF ONE-HALF OF HIS RIGHT TO THOMAS MOULSON, OF SAME PLACE.

CULINARY STEAMER.

SPECIFICATION forming part of Letters Patent No. 231,266, dated August 17, 1880.

Application filed May 28, 1880. (No model.)

*To all whom it may concern:*

Be it known that I, ABNER BURBANK, a citizen of the United States, residing at Rochester, Monroe county, New York, have invented a certain new and useful Improvement in Culinary Steamers; and I do hereby declare that the following is a full, clear, and exact description of the same, reference being had to the accompanying drawings, in which—

Figure 1:
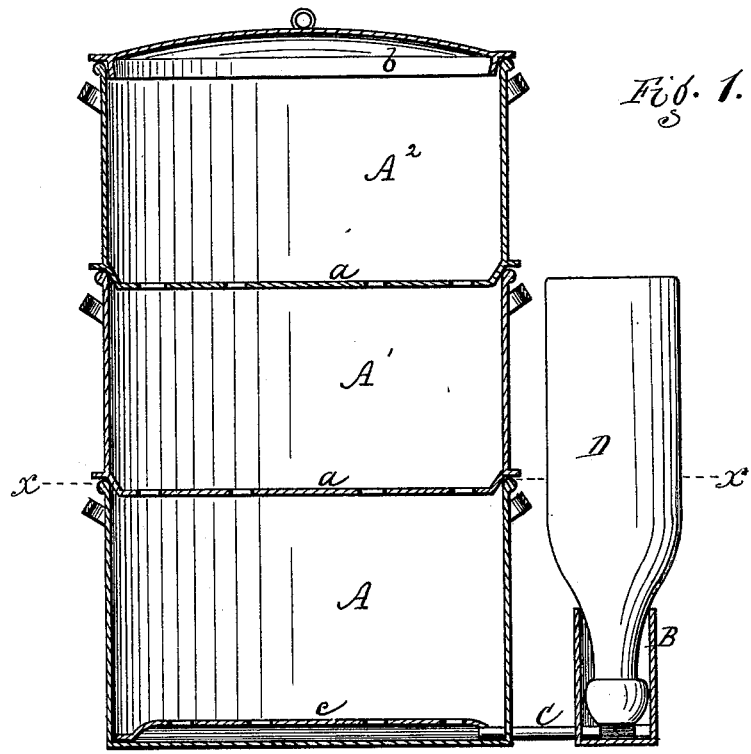
Figure 2:
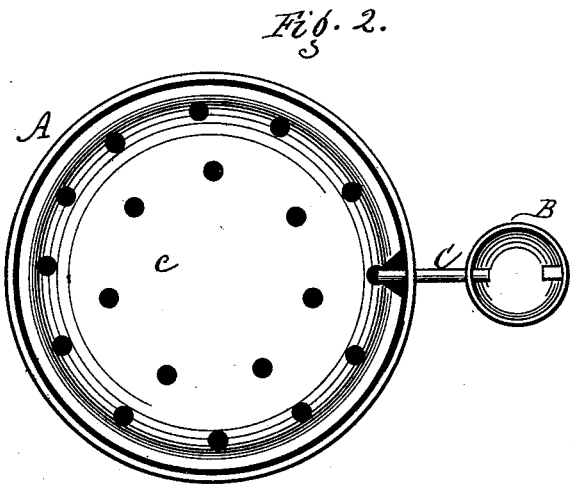

Figure 1 is a vertical section of the device. Fig. 2 is a plan of the bottom section of the apparatus, looking down from line $x$ $x$, Fig. 1.

My improvement relates to culinary steamers for cooking food. As ordinarily made such devices hold a large body of water, which has to be boiled before steam can be generated, which takes some time.

My invention consists in combining with a culinary steamer a self-feeding water attachment, by which means the water is fed into the steamer and stands in a very thin sheet in the bottom, enabling steam to be raised very rapidly and supplying the water as fast as it is evaporated.

In the drawings, A A' A² represent a nest of culinary vessels resting one on top of another, and being of well-known form. These vessels are provided with perforated bottoms $a$ $a$, except the lowest one, and the upper one is covered by a cover, $b$.

The perforated bottoms may be either solid with the vessels or be removable, as desired.

In the bottom of the lowest vessel rests an arched disk, $c$, which is perforated, as shown, said disk standing up from the bottom and leaving a space which serves the double purpose of a steam-generating chamber and a support to keep the materials in the boiler from resting on the bottom and obstructing the action.

B is an open-topped receptacle attached on one side of the bottom vessel, and C is a feed-pipe leading from the bottom of the receptacle into the bottom of the vessel, as shown.

D is an inverted bottle or other device which contains water, and is inserted neck downward into the receptacle B.

The operation is as follows: A small quantity of water is poured into the bottom of vessel A, just enough to cover the end of the pipe C. The bottle is then filled and inserted bottom upward in the receptacle B. A small quantity will run through the pipe C; but as soon as the water rises above the pipe in the boiler the passage of air through the pipe into the bottle will be cut off, and the water will then stand in the bottle without flowing out. As soon as the water evaporates sufficiently to uncover the passage in the pipe the air will pass into the bottle and the water will fall again.

The principle is similar to that of the German student lamp.

The water which enters the boiler from the feed-pipe is spread over the whole bottom in a very thin sheet, and if the boiler is set on a stove it will generate steam with very great rapidity, so that by the time the deep body of water in an ordinary boiler would be heated sufficiently to produce steam the cooking would be well under way in this apparatus.

In an apparatus of ordinary size a pint bottle of water is sufficient to do an ordinary cooking.

The water in the bottle can always be seen, and can be replenished at any time at a moment's notice.

It is quite essential that the self-feeding device should be used in combination with a flat-bottomed boiler, so that the water shall spread over the whole surface, not only to present a large surface for evaporation, but also to keep the bottom from burning out.

The perforated disk $c$ is also of importance, forming by its dishing shape a chamber in which the water can lie and steam be formed beneath the material which is placed in the steamer to cook.

The use of the separate bottle D enables the water to be replenished and supplied without removing the upper boilers.

Having thus described my invention, what I claim as new, and desire to secure by Letters Patent, is—

1. The culinary steamer herein described, consisting of the vessels A A' and the self-feeding water attachment, consisting of the receptacle B, bottle D, and feed-pipe C, arranged to operate in the manner and for the purpose specified.

2. The combination, with the culinary vessels A A' and self-feeding water attachment B C D, of the arched disk c in the bottom of the steamer, forming a steam and water space, as herein shown and described.

In witness whereof I have hereunto signed my name in the presence of two subscribing witnesses.

ABNER BURBANK.

Witnesses:
R. F. OSGOOD,
JOHN C. BURNS.